United States Patent
Gariepy et al.

(10) Patent No.: US 10,241,515 B2
(45) Date of Patent: *Mar. 26, 2019

(54) METHOD, SYSTEM AND APPARATUS FOR HANDLING OPERATIONAL CONSTRAINTS FOR CONTROL OF UNMANNED VEHICLES

(71) Applicant: CLEARPATH ROBOTICS, INC., Kitchener (CA)

(72) Inventors: Ryan Christopher Gariepy, Kitchener (CA); Alex Bencz, Kitchener (CA); Andrew Clifford Blakey, Kitchener (CA); Shahab Kaynama, Etobicoke (CA); James Servos, Kitchener (CA)

( * ) Notice: Subject to any disclaimer, the term of this patent is extended or adjusted under 35 U.S.C. 154(b) by 26 days.

This patent is subject to a terminal disclaimer.

(21) Appl. No.: 15/167,002

(22) Filed: May 27, 2016

(65) Prior Publication Data

US 2016/0349749 A1    Dec. 1, 2016

Related U.S. Application Data

(60) Provisional application No. 62/168,511, filed on May 29, 2015.

(51) Int. Cl.
| | |
|---|---|
| G05D 1/00 | (2006.01) |
| G01C 21/34 | (2006.01) |
| G05D 1/02 | (2006.01) |
| B66F 9/06 | (2006.01) |

(52) U.S. Cl.
CPC ........... *G05D 1/0088* (2013.01); *B66F 9/063* (2013.01); *G01C 21/3407* (2013.01); *G05D 1/0212* (2013.01); *G05D 1/0223* (2013.01); *G05D 1/0274* (2013.01); *G05D 1/0297* (2013.01); *G05D 2201/0216* (2013.01)

(58) Field of Classification Search
CPC .. G05D 1/0088; G05D 1/0274; G05D 1/0223; G05D 1/0297; G05D 1/0212; G05D 2201/0216; B66F 9/063; G01C 21/3407
See application file for complete search history.

(56) References Cited

U.S. PATENT DOCUMENTS 9,487,356 B1 * 11/2016 Aggarwal ............ B65G 1/1373
2017/0039765 A1 * 2/2017 Zhou ..................... G06T 19/006

* cited by examiner

*Primary Examiner* — Yuen H Wong
(74) *Attorney, Agent, or Firm* — Kuyler Neable

(57) ABSTRACT

Systems, methods and apparatus are provided for handling operational constraints for unmanned vehicles. The system includes: a plurality of mobile unmanned vehicles for deployment in an environment; a computing device connected to the plurality of unmanned vehicles via a network, the computing device storing, in a memory, a plurality of operational constraints; each operational constraint including (i) a type identifier, (ii) an indication of a region of the environment, and (iii) a property defining a constraint on the operation of the unmanned vehicles within the region. The computing device is configured to: receive a request from one of the mobile unmanned vehicles, the request identifying an operational constraint; responsive to receiving the request, retrieve an operational constraint from the memory based on the request; and send the retrieved operational constraint to the one of the mobile unmanned vehicles.

19 Claims, 7 Drawing Sheets

METHOD, SYSTEM AND APPARATUS FOR HANDLING OPERATIONAL CONSTRAINTS FOR CONTROL OF UNMANNED VEHICLES

CROSS-REFERENCE TO RELATED APPLICATION

This application claims the benefit of priority from U.S. Provisional Patent Application No. 62/168,511, filed May 29, 2015 and entitled "METHOD, SYSTEM AND APPARATUS FOR HANDLING OPERATIONAL CONSTRAINTS FOR CONTROL OF UNMANNED VEHICLES", the contents of which are hereby incorporated by reference.

FIELD

The specification relates generally to the control of unmanned vehicles, and specifically to a method, system and apparatus for handling operational constraints for the control of unmanned vehicles.

BACKGROUND

Mobile unmanned vehicles (also referred to as autonomous mobile robots or self-driving vehicles) operate in a wide variety of environments. Such environments can have various physical characteristics that the vehicles may be required to navigate around, interact with and the like, in order to operate successfully. Physical characteristics such as those mentioned above can generally be represented in maps of the environments stored by the vehicles. The operating environments of the vehicles, however, may also impose other restrictions on the operation of the vehicles that do not arise directly from physical characteristics of the environments, or that arise from physical characteristics that are not readily detectable by the vehicles. Such restrictions are less suitable for representation in maps, and can therefore render the operation of self-driving vehicles difficult.

SUMMARY

The specification is generally directed to systems, apparatuses and methods for generating and deploying operational constraints from a computing device to at least one self-driving vehicle. For example, a computing device in communication with one or more self-driving vehicles stores operational constraints associated with respective regions of an environment in which the self-driving vehicles are to operate. The operational constraints each contain a property defining a constraint on the operation of self-driving vehicles within the relevant region. The computing device provides operational constraints to a self-driving vehicle, either at the vehicle's request, or along with task assignments for the vehicle, or both, to control how the self-driving vehicle will operate in the region of the environment associated with the transmitted operational constraint.

According to an aspect of the specification, a system is provided, comprising: at least one mobile unmanned vehicle for deployment in an environment; a computing device connected to the at least one unmanned vehicle via a network, the computing device storing, in a memory, a plurality of operational constraints; each operational constraint including (i) a type (class) identifier, (ii) an indication of a region of the environment, and (iii) a property defining a constraint on the operation of the at least one unmanned vehicle within the region; the computing device configured to: receive a request from one of the at least one mobile unmanned vehicle, the request identifying an operational constraint; responsive to receiving the request, retrieve an operational constraint from the memory based on the request; and send the retrieved operational constraint to the one of the at least one mobile unmanned vehicle.

According to another aspect of the specification, a method is provided in a system having at least one mobile unmanned vehicle for deployment in an environment and a computing device connected to the at least one unmanned vehicle via a network, the method comprising: storing, in a memory of the computing device, a plurality of operational constraints; each operational constraint including (i) a type identifier, (ii) an indication of a region of the environment, and (iii) a property defining a constraint on the operation of the at least one unmanned vehicle within the region; at the computing device: receiving a request from one of the at least one mobile unmanned vehicle, the request identifying an operational constraint; responsive to receiving the request, retrieving an operational constraint from the memory based on the request; and sending the retrieved operational constraint to the one of the at least one mobile unmanned vehicle.

According to a further aspect of the specification, a non-transitory computer-readable medium is provided storing computer-readable instructions for execution by a processor of a computing device for causing the computing device to perform a method comprising: storing a plurality of operational constraints; each operational constraint including (i) a type identifier, (ii) an indication of a region of an environment in which at least one mobile unmanned vehicle is to be deployed, and (iii) a property defining a constraint on the operation of the at least one unmanned vehicle within the region; receiving a request from one of the at least one mobile unmanned vehicle, the request identifying an operational constraint; responsive to receiving the request, retrieving an operational constraint from the memory based on the request; and sending the retrieved operational constraint to the one of the at least one mobile unmanned vehicle via the network.

BRIEF DESCRIPTIONS OF THE DRAWINGS

Embodiments are described with reference to the following figures, in which.

DETAILED DESCRIPTION OF THE EMBODIMENTS

Figure 1:
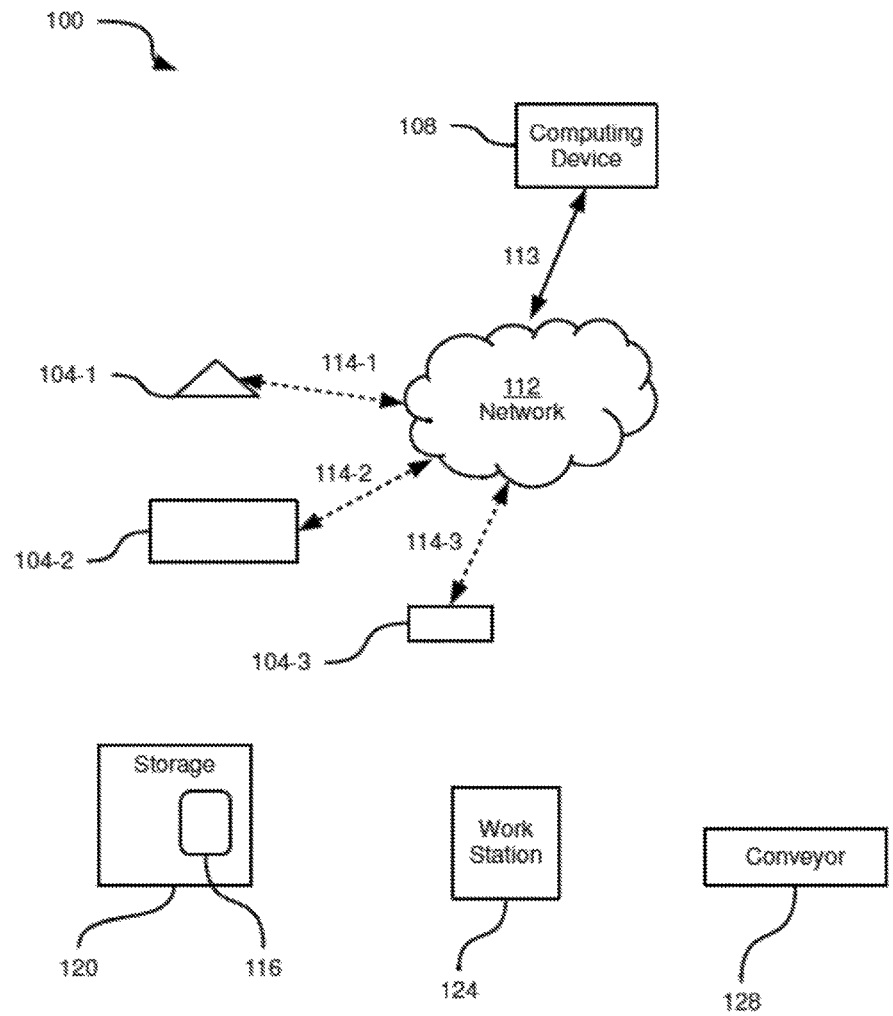
FIG. 1 depicts a system for controlling unmanned vehicles, according to a non-limiting embodiment.

FIG. 1 depicts a system 100 including a plurality of self-driving vehicles, referred to herein as mobile unmanned vehicles 104-1, 104-2 and 104-3 (collectively referred to as unmanned vehicles 104, and generically referred to as an unmanned vehicle 104, or simply a vehicle 104; similar nomenclature is used for other reference numerals herein) for deployment in a facility, such as a manufacturing facility, warehouse or the like. The facility can be any one of, or any suitable combination of, a single building, a combination of buildings, an outdoor area, and the like. A greater or smaller number of unmanned vehicles 104 may be included in system 100 than the three shown in FIG. 1. Unmanned vehicles 104 can have a wide variety of operational characteristics (e.g. maximum payload, dimensions, weight, maximum speed, battery life, and the like).

System 100 also includes a computing device 108 for connection to unmanned vehicles 104 via a network 112. Computing device 108 can be connected to network 112 via, for example, a wired link 113, although wired link 113 can be any suitable combination of wired and wireless links in other embodiments. Unmanned vehicles 104 can be connected to network 112 via respective wireless links 114-1, 114-2 and 114-3. Links 114 can be any suitable combination of wired and wireless links in other examples, although generally wireless links are preferable to reduce or eliminate obstacles to the free movement of unmanned vehicles 104 about the facility. Network 112 can be any suitable one of, or any suitable combination of, wired and wireless networks, including local area networks (LAN or WLAN), wide area networks (WAN) such as the Internet, and mobile networks (e.g. GSM, LTE and the like).

Computing device 108 can control unmanned vehicles 104, for example by instructing unmanned vehicles 104 to carry out tasks within the facility. The nature of the tasks performed by unmanned vehicles 104 under the control of computing device 108 is not particularly limited. In general, the tasks assigned to unmanned vehicles 104 require unmanned vehicles 104 to perform various actions at various locations within the facility. Data defining the actions and locations are provided to unmanned vehicles 104 by computing device 108 via network 112.

The actions, items and locations mentioned above are not particularly limited. For example, an unmanned vehicle 104 can be instructed to simply travel to a specific location. In other examples, an unmanned vehicle 104 can be instructed to travel to a specified location and pick up, drop off, or otherwise manipulate, an item (e.g. a tool, container, and the like), or perform any other suitable action (e.g. park, begin a mapping algorithm, and so on). Locations include any regions within the facility bounded by coordinates. Such regions can be three-dimensional (i.e. volumes), two-dimensional (i.e. areas), one-dimensional (i.e. lines) or zero-dimensional (i.e. points).

In the present example, a first location 120 is illustrated, which may be employed to store items, such as an item 116 (e.g. a container). Location 120 can be an area defined on a floor of the facility for storage of items. A second location 124 is also illustrated, containing, for example, a work station where materials are to be removed from or placed in item 116, or where item 116 is to be labelled or otherwise modified. A wide variety of other work station activities will occur to those skilled in the art (e.g. welding stations, paint spray booths, and so on). A third location 128 is also illustrated in FIG. 1. In the present example, third location 128 contains a conveyor apparatus, which may carry item 116 to another part of the facility.

When a vehicle 104 is assigned a task by computing device 108, that vehicle 104 is configured to generate a path for completing the task (e.g. a path leading from the vehicle's current location to the end location of the task; the path may include one or more intermediate locations between the start location and the end location). In some embodiments, computing device 108 can assist the vehicle 104 in path generation (also referred to as path planning), or can generate the path without the involvement of the vehicle 104 and send the completed path to the vehicle 104 for execution.

Generation of the above-mentioned paths can be based on, for example, a map of the facility stored at one or both of computing device 108 and vehicles 104. Path generation may also depend on attributes of the relevant vehicle 104. For example, the map may indicate that a certain area of the facility contains constricted areas unsuitable for vehicles 104 greater than certain dimensions; if a vehicle 104 has dimensions greater than those of the constricted areas, a path may therefore be generated for that vehicle 104 that avoids the constricted areas.

Various other information can also impact not only the generation of paths for vehicles 104, but also the execution of those paths by vehicles 104 and the performance of actions by vehicles 104 in connection with the paths. Such other information may not be amenable to storage in the above-mentioned map (e.g. because the information may not relate directly to physical features of the facility). As will be discussed in greater detail below, system 100 is configured to receive, store and deploy to vehicles 104 a wide variety of such other information, referred to broadly herein as operational constraints for vehicles 104.

Before describing the handling of operational constraints by system 100 in greater detail, an example vehicle 104 and certain internal components of computing device 108 will be described.

Figure 2:
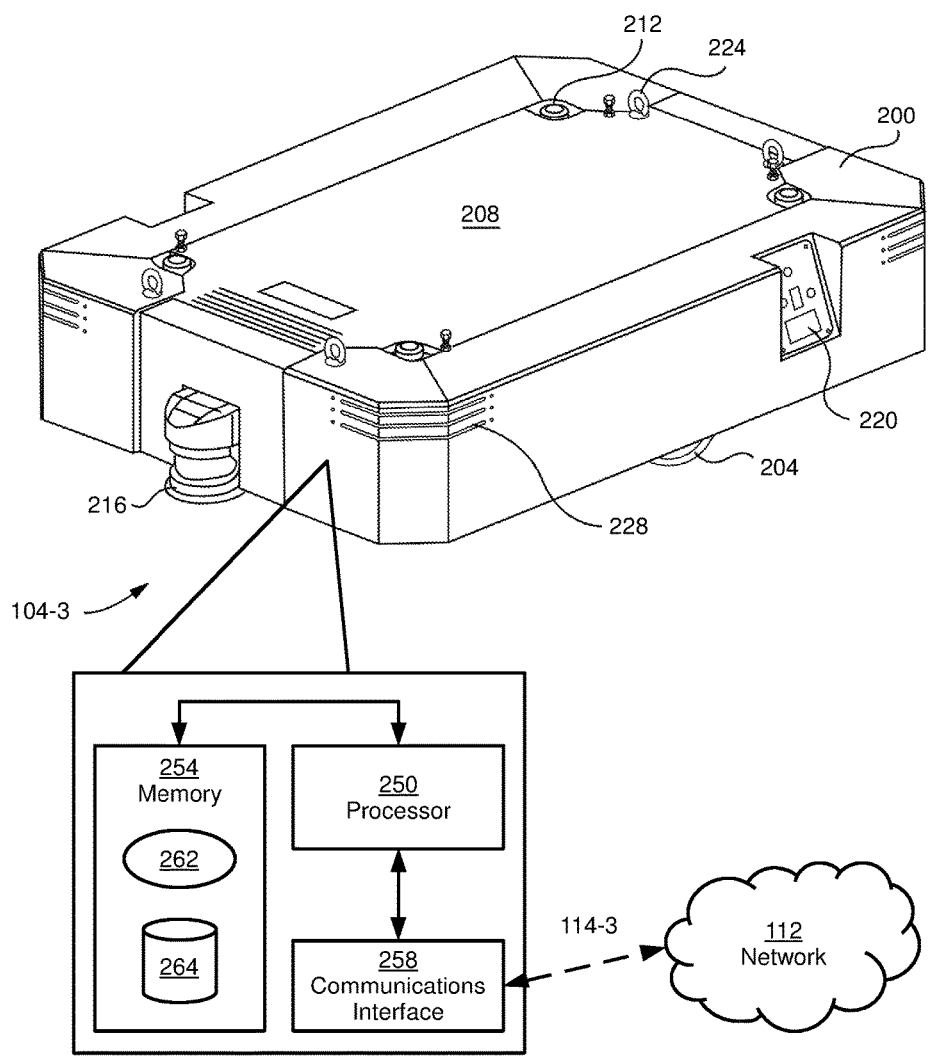
FIG. 2 depicts certain components of an unmanned vehicle of the system of FIG. 1, according to a non-limiting embodiment.

Referring now to FIG. 2, an example unmanned vehicle 104 is shown. In particular, unmanned vehicle 104-3 is depicted according to a non-limiting embodiment. Other vehicles 104 need not be identical to vehicle 104-3 as depicted, but are generally as described below. Unmanned vehicle 104-3 is depicted as a terrestrial vehicle, although it is contemplated that unmanned vehicles 104 can also include aerial vehicles and watercraft. Unmanned vehicle 104-3 includes a chassis 200 containing or otherwise supporting various other components, including one or more locomotive devices 204. Devices 204 in the present example are wheels, although in other embodiments any suitable locomotive device, or combination thereof, may be employed (e.g. tracks, propellers, and the like).

Locomotive devices 204 are powered by one or more motors (not shown) contained within chassis 200. The motors of unmanned vehicle 104-3 can be electric motors, internal combustion engines, or any other suitable motor or combination of motors. In general, the motors drive the locomotive devices 204 by drawing power from an energy storage device (not shown) supported on or within chassis 200. The nature of the energy storage device can vary based on the nature of the motors. For example, the energy storage can include batteries, combustible fuel tanks, or any suitable combination thereof.

Unmanned vehicle 104-3 also includes a load-bearing surface 208 (also referred to as a payload surface), for carrying an item such as item 116 thereon. In some examples, payload surface 208 can be replaced or supplemented with other payload-bearing equipment, such as a cradle, a manipulator arm, or the like.

Unmanned vehicle 104-3 can also include a variety of sensors. In the present example, such sensors include at least one load cell 212 coupled to payload surface 208, for measuring a force exerted on payload surface 208 (e.g. by an item being carried by unmanned vehicle 104-3). The sensors of unmanned vehicle 104-3 can also include machine vision sensors 216, such as any suitable one of, or any suitable combination of, barcode scanners, laser-based sensing devices (e.g. a LIDAR sensor), cameras and the like. Unmanned vehicle 104-3 can also include a location sensor (not shown) such as a GPS sensor, for detecting the location of unmanned vehicle 104-3 with respect to a frame of reference. The frame of reference is not particularly limited, and may be, for example, a global frame of reference (e.g. GPS coordinates), or a facility-specific frame of reference. Other sensors that can be provided with unmanned vehicle 104-3 include accelerometers, fuel-level or battery-level sensors, and the like.

Unmanned vehicle 104-3 can also include a control panel 220, as well as anchors 224 for securing items or other equipment to chassis 200, or for lifting chassis 200 (e.g. for maintenance). Unmanned vehicle 104-3 can also include any of a variety of other features, such as indicator lights 228.

In addition, unmanned vehicle 104-3 includes a central processing unit (CPU) 250, also referred to as a processor 250, interconnected with a non-transitory computer-readable medium such as a memory 254. Processor 250 and memory 254 are generally comprised of one or more integrated circuits (ICs), and can have a variety of structures, as will now occur to those skilled in the art (for example, more than one CPU can be provided). Memory 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Unmanned vehicle 104-3 also includes a communications interface 258 (e.g. a network interface controller or NIC) interconnected with processor 250. Via communications interface 258, link 114-3 and network 112, processor 254 can send and receive data to and from computing device 108. For example, unmanned vehicle 104-3 can send updated location data to computing device 108, and receive operational constraints from computing device 108.

Additionally, processor 250 is interconnected with the other components of unmanned vehicle 104-3 mentioned above, such as sensors 212 and 216 and control panel 220.

Memory 254 stores a plurality of computer-readable programming instructions, executable by processor 300, in the form of various applications, including a vehicle control application 262. As will be understood by those skilled in the art, processor 250 can execute the instructions of application 262 (and any other suitable applications stored in memory 254) in order to perform various actions defined within the instructions. In the description below processor 250, and more generally any vehicle 104, is said to be "configured to" perform certain actions. It will be understood that vehicles 104 are so configured via the execution of the instructions of the applications stored in memory 254. Memory 254 also stores a cache 264, to be discussed in greater detail below.

Figure 3:
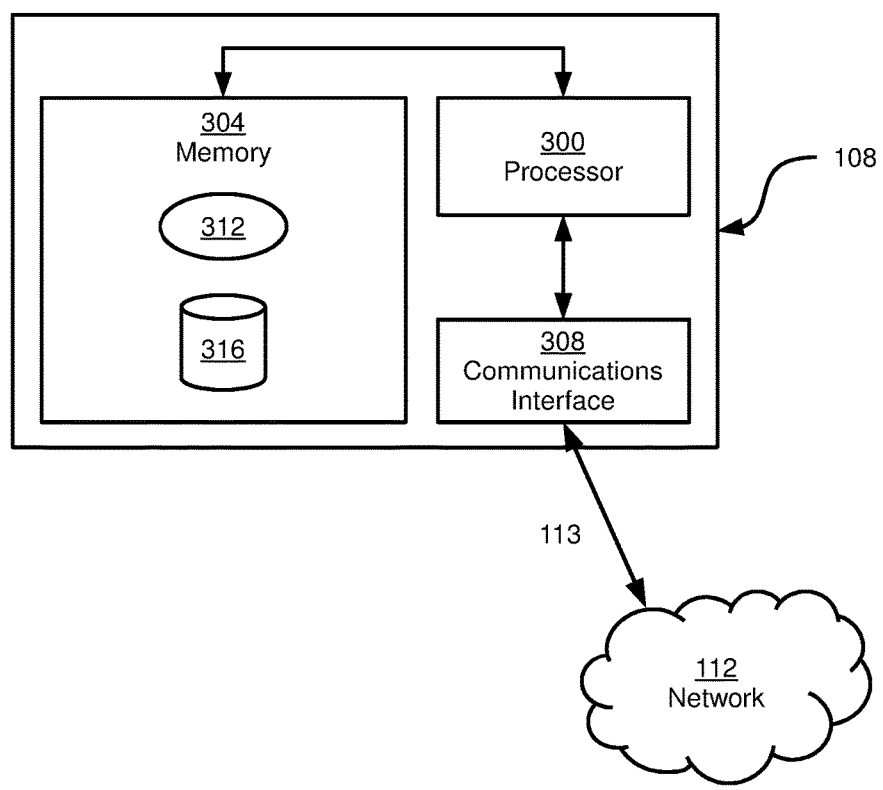
FIG. 3 depicts certain internal components of the computing device of FIG. 1, according to a non-limiting embodiment.

Turning now to FIG. 3, certain internal components of computing device 108 are illustrated. Computing device 108 can be any one of, or any combination of, a variety of computing devices. Such devices include desktop computers, servers, mobile computers such as laptops and tablet computers, and the like. Computing device 108 therefore includes at least one central processing unit (CPU), also referred to herein as a processor, 300. Processor 300 is interconnected with a non-transitory computer-readable medium such as a memory 304. Processor 300 is also interconnected with a communications interface 308.

Processor 300 and memory 304 are generally comprised of one or more integrated circuits (ICs), and can have a variety of structures, as will now occur to those skilled in the art (for example, more than one CPU can be provided). Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Communications interface 308 allows computing device 108 to connect with other computing devices (e.g. unmanned vehicles 104) via network 112. Communications interface 308 therefore includes any necessary hardware (e.g. network interface controllers (NICs), radio units, and the like) to communicate with network 112 over link 113. Computing device 108 can also include input and output devices, such as keyboards, mice, displays, and the like (not shown).

Memory 304 stores a plurality of computer-readable programming instructions, executable by processor 300, in the form of various applications, including an operational constraints handling application 312. As will be understood by those skilled in the art, processor 300 can execute the instructions of application 312 (and any other suitable applications) in order to perform various actions defined within the instructions. In the description below processor 300, and more generally computing device 108, are said to be "configured to" perform those actions. It will be understood that they are so configured via the execution of the instructions of the applications stored in memory 304.

Memory 304, in the present example, also stores various types of data for retrieval, processing and updating during the execution of application 312. In particular, memory 304 stores an operational constraints database 316. Memory 304 may also store other data (not shown), such as a map of the facility of FIG. 1, as well as vehicle attributes, location-related data, and the like.

Figure 4:
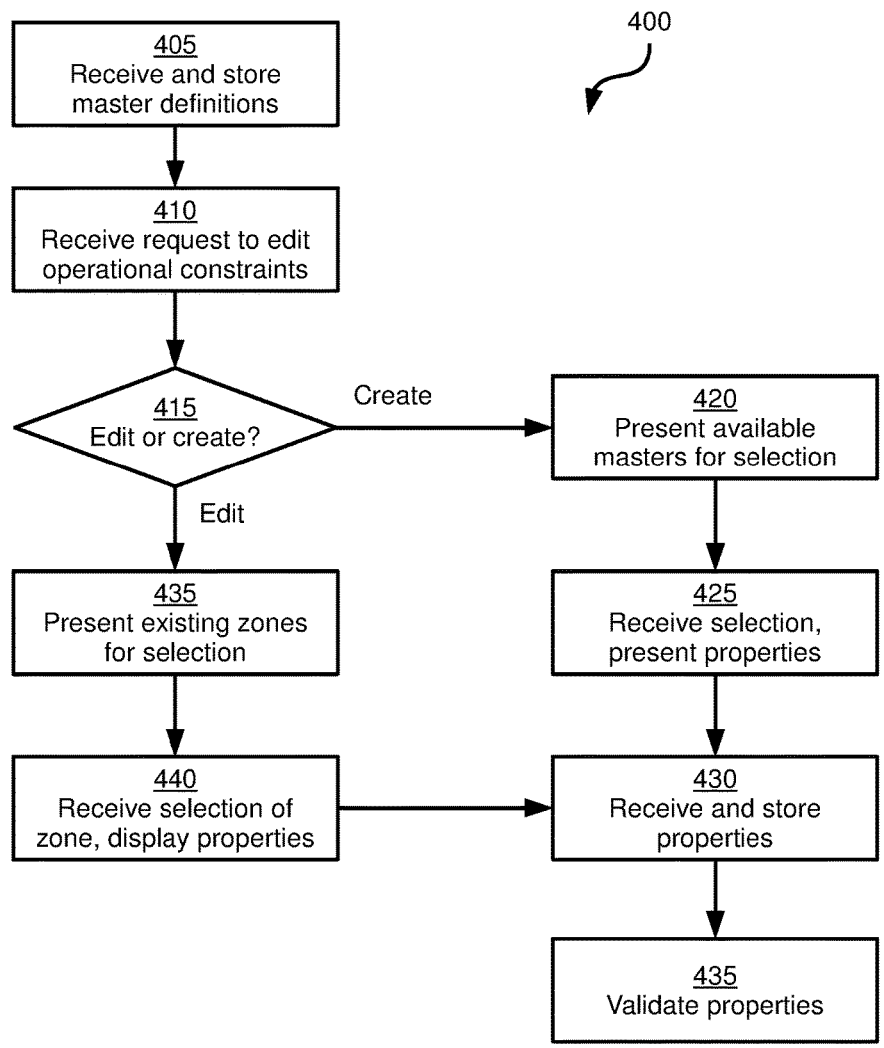
FIG. 4 depicts a method of receiving and storing operational constraints in the system of FIG. 1, according to a non-limiting embodiment.

Turning now to FIG. 4, a method 400 for generating and storing operational constraints is illustrated. The performance of method 400 will be described in connection with its performance in system 100, although it is contemplated that method 400 can also be performed in other suitable systems. The blocks of method 400 as described below are performed by computing device 108, via the execution of application 312 by processor 300. In other embodiments, however, method 400 can also be performed by any of unmanned vehicles 104 (that is, by processor 250 of a given vehicle 104).

Beginning at block 405, computing device 108 is configured to receive and store operational constraint type definitions, also referred to as operational constraint templates or masters. Each operational constraint master defines a type of operational constraint, as well as the properties that can be assigned to that type of operational constraint. The nature of the receipt of operational constraint masters at block 405 is not particularly limited. For example, the masters may be received at processor 300 via input devices such as a keyboard and mouse. Upon receipt the operational constraint masters are stored in database 316.

Table 1 illustrates examples of operational constraint masters.

TABLE 1

| Operational Constraint Masters | | |
| --- | --- | --- |
| Type | Property Identifiers | Property Definitions |
| Speed Limit | Location | space on map |
| | Upper limit | speed in m/s |
| | Lower limit | speed in m/s |
| | Time Period | start time, end time |
| One-Way | Location | space on map |
| | Direction | direction on map; tolerance |

In particular, two types of operational constraints are illustrated above. A speed limit operational constraint type provides a definition for creating speed limit operational constraints that apply to the facility of FIG. 1. As required by the master above, each speed limit operational constraint (also referred to herein as zone) defines a space on the map of the facility where that constraint applies. The space may be a volume, an area, a line, or a point, and can be defined in a variety of ways (e.g. by coordinates). Thus, the location properties for zones correspond to "real" physical spaces in the facility. Each speed limit zone also defines an upper speed limit for unmanned vehicles 104 within the zone, a lower speed limit, and a time period during which the operational constraint applies. It will be appreciated that a wide variety of properties may be defined for each operational constraint type. Further, some properties may be indicated as mandatory, while others may be optional (e.g. a lower speed limit and the time property may be optional).

Another example of an operational constraint type is a one-way operational constraint. Based on the master above, each one-way zone includes a location, as well as a direction, with or without an associated tolerance. For example, a one-way zone may state that unmanned vehicles in a certain area of the facility must travel in a direction ten degrees east of north, plus or minus five degrees. As will now be apparent to those skilled in the art, a variety of other ways may also be employed to represent directions and tolerances.

Having stored operational constraint templates, at block 410 computing device 108 is configured to receive a request to edit operational constraints. For example, computing device 108 can received such a request in the form of input data from a keyboard or mouse, or via network 112 via another computing device. In some examples, the request can be received from a vehicle 104.

At block 415, computing device 108 is configured to determine whether the request received at block 410 is a request to edit an existing zone, or to create a new zone. For example, the request received at block 410 can be a selection of one of several user-selectable elements of a graphical user interface (GUI) presented on a display connected to processor 300. The determination at block 415 can therefore include a determination of which selectable element was selected (e.g. an element corresponding to zone creation, or an element corresponding to zone editing).

When the request received at block 410 is a request to create a new zone, performance of method 400 advances to block 420, at which computing device 108 retrieves the zone types defined by the masters received and stored at block 405. Thus, if Table 1 represents the currently stored zone masters, at block 420 computing device 108 retrieves the zone types "speed limit" and "one-way" and presents those zone types for selection. Presenting zone types for selection can involve controlling a display to render an interface 500, shown in FIG. 5, including selectable elements 504 and 508 corresponding to each retrieved zone type.

In other embodiments, rather than rendering the available zone types for selection at block 420, computing device 108 can present the available zone types for selection via other means, such as by transmitting the zone types via network 112 to another computing device.

Returning to FIG. 4, following the performance of block 420, computing device 108 is configured to receive a selection of one of the zone types presented at block 420, and in response to retrieve and present the properties defined by the master corresponding to the selected zone type. Thus, referring again to FIG. 5, an updated interface 512 can be rendered on a display connected to processor 300, in which selectable elements are provided for defining the location and direction properties defined in Table 1. For example, the location property can be defined by drawing (e.g. via input data received from a mouse, touch screen or the like) an area, volume or the like 516 on a rendering of the map of the facility. In other embodiments, the location can be specified by received input data in the form of coordinates on the map.

Figure 5:
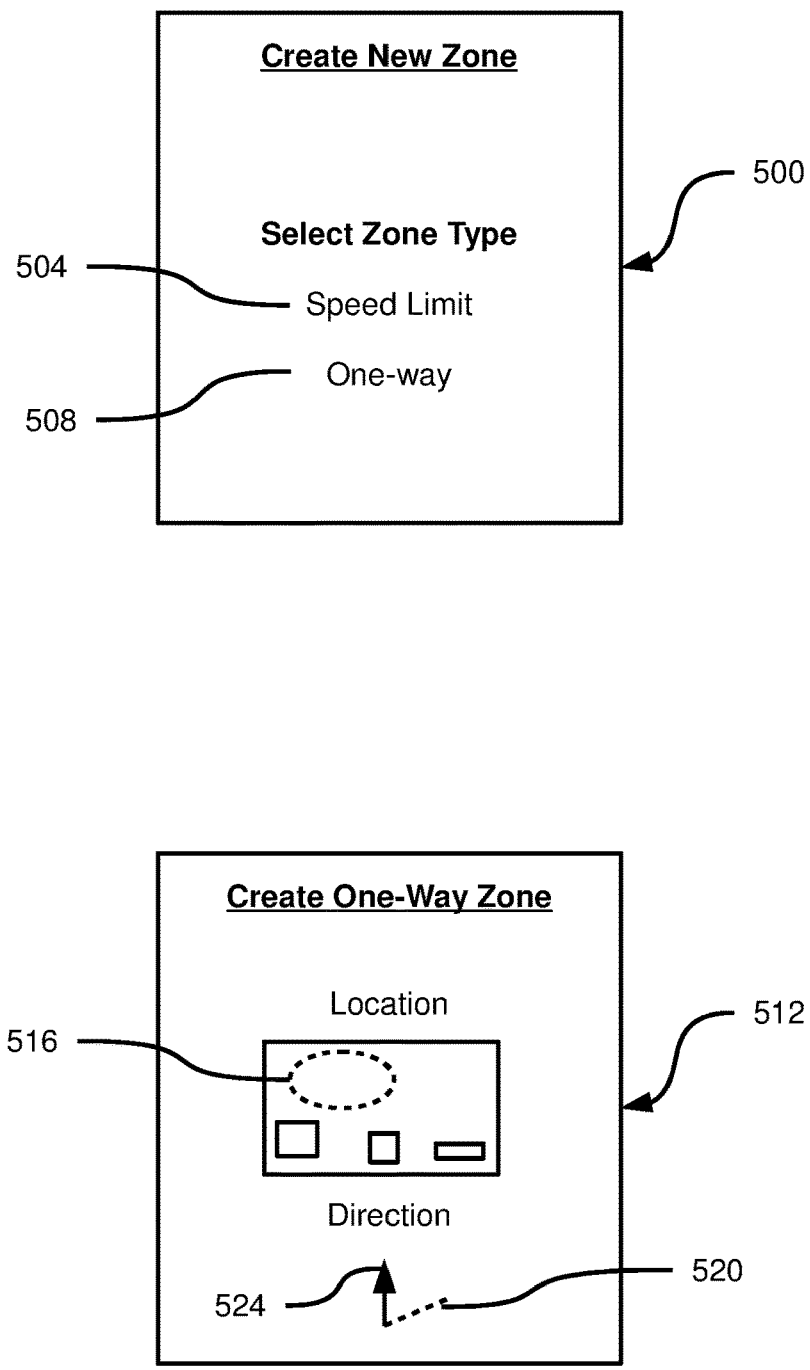
FIG. 5 depicts example interfaces presented by the computing device of FIG. 1 during the method of FIG. 4, according to a non-limiting embodiment.

The direction property of the one-way zone can be specified, for example, by setting an angle 520 relative to an indicator of cardinal north 524 (or any other known direction. Angle 520 can be specified directly on the map shown in interface 512 in some embodiments, rather than as a separate interface element from the map (as shown in FIG. 5). In other embodiments, the direction can be specified by way of input data identifying an angle and a tolerance. Returning to FIG. 4, at block 430 computing device 108 is configured to store the newly received zone in database 316.

If, on the other hand, the request received at block 410 is determined (at block 415) to be a request to edit an existing zone, then at block 435 computing device 108 can be configured to retrieve the existing zones in database 316 and present the zones for selection. In some embodiments, the existing zones can be retrieved and presented based on a zone type; for example, between blocks 415 and 435 computing device 108 can present an interface similar to interface 500 for receiving a selection of which zone type is to be edited.

Upon receipt of a selection of a specific zone to edit at block 440, computing device 108 retrieves the properties of that zone and presents the retrieved properties (e.g. on a display). The display of zone properties at block 440 can be implemented via the presentation of an interface such as interface 512 shown in FIG. 5. Performance of method 400 then proceeds to block 430, at which properties for the relevant zone are received and stored as described above. Editing properties presented at block 440 and 430 can include deleting properties. When the editing inputs received via an interface such as interface 512 include the removal of all properties for a zone (or selection of a "delete zone" element), the receipt and storage of properties at block 430 involves removing the zone from memory.

As a result of repeated performances of method 400 (or, at least, repeated performances of blocks 420-430), a plurality of operational constraints, or zones, can be maintained in database 316, each having a type, a location, and one or more properties.

In some embodiments, computing device 108 is configured to perform a validation or simulation at block 435, after receiving updates to operational constraints (e.g. new operational constraints or edited operational constraints). In particular, computing device 108 can be configured to detect conflicts in the operational constraints, such as one-way zones with incompatible direction properties (e.g. opposite directions). Computing device 108 can also be configured to detect potential conflicts between zones that are not overlapping but adjacent to each other. For example, when two speed limit zones are in close proximity, and one zone has a greater minimum speed than the maximum speed of the other zone, computing device 108 can compare the difference between the required speeds of the zones to the known accelerations and decelerations of unmanned vehicles 104. Computing device 108 can thus determine whether the proximity of the zones, in combination with their differing requirements, would result in unmanned vehicles 104 being unable to comply with the operational constraints when traversing both zones (e.g. because the vehicles 104 cannot accelerate or decelerate quickly enough). When conflicts or potential conflicts are detected, computing device 108 can generate a warning message, for example on the display mentioned in connection with FIG. 5.

Figure 6:
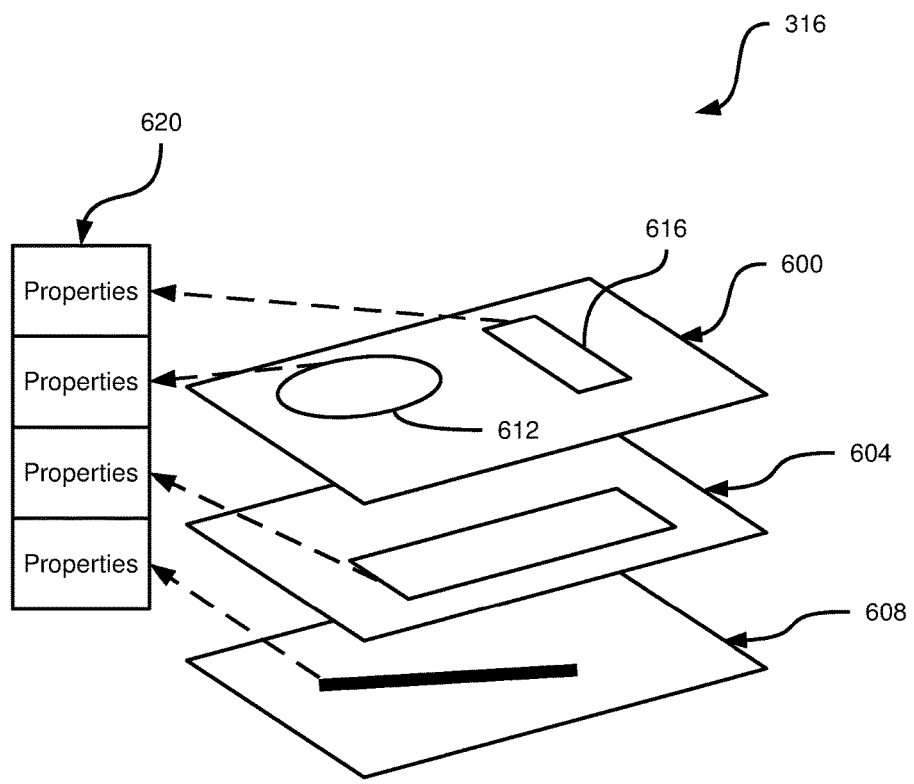
FIG. 6 depicts an example data structure for storing the operational constraints received in the method of FIG. 4, according to a non-limiting embodiment.

The zones and their properties can be stored in a wide variety of ways. For example, turning to FIG. 6, three layers 600, 604 and 608 of zones are depicted as stored in database 316. The layers can be depicted, for example, in a plurality of image files (e.g. vector or raster-based images). In other embodiments, the layers can be stored in a variety of other formats, such as tables of coordinates or the like. In the present example, each layer can store the locations of zones of a particular type as polygons (or volumes, points, lines or the like). Thus, layer 600 can contain one-way zone locations (e.g. locations for two zones, 612 and 616, are visible), layer 604 can contain speed limit locations, and layer 608 can contain locations for another type of zone (e.g. emergency aisles in the facility). Each layer (e.g. image file) can contain the remaining properties 620 corresponding to the zones, or can contain references to those properties stored separately in database 316. In other embodiments, database 316 can contain an index linking layers 600, 604, 608 and properties 620. Thus, in some embodiments, location and zone type can be considered primary properties of the zones, as those are the properties defining which layer the zone is depicted in, while the remaining properties can be considered secondary properties.

A wide variety of zone types and properties are contemplated, in addition to those discussed above. Other examples of zone types and corresponding properties (beyond those already discussed) include: stop before proceeding (e.g. with properties specifying a length of time to stop); restricted areas, such as the above-mentioned emergency aisles (e.g. with properties specifying that such zones are active only when an alarm is sounding in the facility); parking zones indicating areas where vehicles 104 may dock for periods of inactivity; height-restricted zones (e.g. with maximum permitted vehicle heights); weight-restricted zones (e.g. with maximum permitted vehicle weights); map quality zones (e.g. with properties indicating a level of confidence in the map in each zone). Other zone types and properties will also occur to those skilled in the art. As a further example, restricted area zones may include properties identifying classes or vehicles 104 or individual vehicles 104 that are prohibited or permitted from entering such areas).

Still other examples of zone types include undetectable (by unmanned vehicles 104) physical features of the facility that are therefore less well-suited for representation in the map. For example, ramps or other such features of the facility may be represented as operational constraints. Further examples of properties include transitional properties associated with the boundaries of zones. For example, a speed limit zone may include a secondary speed limit property that is applied when an unmanned vehicle is within a predetermined distance of the edge of the zone.

Computing device 108 can also be configured to allocate tasks to unmanned vehicles 104 based on operational constraints. For example, computing device 108 can receive a task for assignment, and retrieve operational constraints associated with a location identified in the task. In combination with unmanned vehicle characteristics, computing device 108 can then select an unmanned vehicle 104 to perform the task (e.g. picking up an item in a specific location). For example, computing device may exclude certain unmanned vehicles 104 from the above-mentioned selection when the task to be assigned lies within a height-restricted zone with a maximum height that is smaller than the known height of those unmanned vehicles 104.

Figure 7:
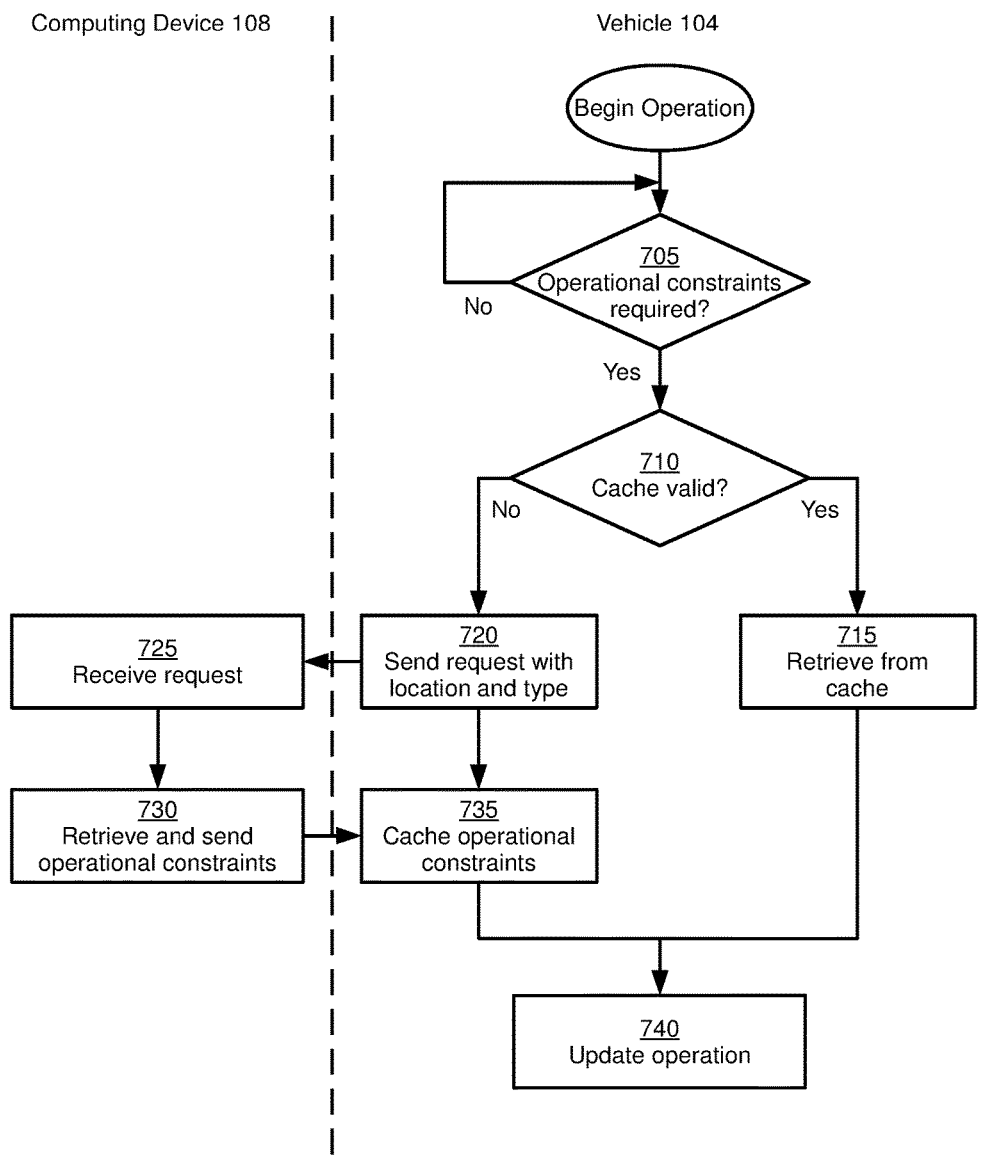
FIG. 7 depicts a method of deploying the operational constraints received in the method of FIG. 4, according to a non-limiting embodiment.

Turning now to FIG. 7, a method 700 for deploying operational constraints is illustrated. Method 700 will be described in connection with its performance in system 100, although it is contemplated that method 700 can also be performed in other suitable systems.

Beginning at block 705, a vehicle 104 is configured to determine whether operational constraint data is required. The determination at block 705 can take various forms, and generally involves determining whether a navigational process executed by the processor 250 of the vehicle 104 requires operational constraint data. For example, the vehicle 104 can begin executing a path planning (i.e. path generation) process that incorporates operational constraint data, following receipt of a task assignment from computing device 108. In another example, the vehicle 104 can perform a path execution process to travel a previously generated path. The path execution process can incorporate operational constraint data. In some examples, the path generation and path execution processes can incorporate different operational constraints. For example, path generation may require the use of one-way zones, whereas path execution data may require the use of speed limit zones (which can be ignored during path generation in some embodiments).

In other examples, the determination at block 705 can be a determination of whether a current location of the vehicle 104 is acceptable (i.e. complies with operational constraints). In still other examples, the vehicle 104 can initiate a mapping or localization process and determine that operational constraint data is required to complete the process.

When the determination at block 705 is negative, the unmanned vehicle 104 continues operating as before. When the determination at block 705 is affirmative, however, the vehicle 104 determines, at block 710, whether the required operational constraint data is present in cache 264. It is therefore contemplated that when the determination at block 705 is affirmative, the vehicle 104 is configured to identify required operational constraint data, such as a zone type, a location, or the like. For example, when block 705 is performed in connection with a path execution process, the required location may be a portion of the path (or the entire path), and the zone types may include any zone types relevant to path execution (e.g. speed limits).

The performance of block 710 thus includes examining the contents of cache 264 for operational constraints corresponding to any requirements identified at block 705. In some embodiments, the determination at block 710 can include simply determining whether operational constraints corresponding to those identified at block 705 are present in cache 264. In other embodiments, when the required operational constraints are present in cache 264, the vehicle 104 can also determine whether the required constraints are valid, for example by determining the age of those constraints in cache 264. The vehicle 104 may also send a request (not shown) to computing device 108 to retrieve a timestamp indicating the last time database 316 was modified. If the timestamp is more recent than the age of cache 264, the determination at block 710 can be negative (even if the required constraints are present in cache 264).

When the determination at block 710 is affirmative, the vehicle 104 proceeds to block 715 and retrieves, from cache 264, the operational constraint data identified as being required at block 705. When the determination at block 710 is negative, however, the vehicle 104 proceeds to block 720.

At block 720, the vehicle 104 is configured to transmit a request for operational constraint data to computing device 108. The request can contain one or more of a location (e.g. the current location of vehicle 104, another specified location in the facility, including a set of locations such as a path, and the like), and a zone type. As will now be apparent to those skilled in the art, the request can include identifiers (e.g. of a zone type and location) corresponding to the required data identified at block 705. The location can also be omitted in order to request all available data for the facility. Likewise, zone types can also be omitted from the request to request data for all available types. Thus, vehicle 104 can send a request without a location or zone type in order to request all available zone data. In further embodiments, computing device 108 can store, in database 316, identifiers of zone types in association with identifiers of vehicles 104. Thus, vehicles 104 can omit zone types from requests and receive zone data of a specific type (or set of types) based on the above associations.

At block 725, computing device 108 is configured to receive the request via network 112. At block 730, responsive to receiving the request at block 725, computing device 108 is configured to retrieve the data identified in the request and send the requested data to the vehicle 104. Computing device 108 can be configured to retrieve the data in a variety of ways. For example, computing device 108 can be configured to select any zone having the type specified in the request and intersecting the location specified in the request. It will now be apparent that if no type was specified in the request, zones of all types may be retrieved at block 730.

At block 735, the vehicle 104 is configured to receive the operational constraints sent by computing device 108 and store the operational constraints in cache 264. Proceeding then to block 740, the vehicle 104 is configured to update its operation based on the operational constraint data received from computing device 108 or retrieved from cache 264 at block 715. Updating the operation of the vehicle 104 can include updating the vehicle's trajectory, performing a preconfigured action, sending a signal to anther device, or any of a wide variety of other operational behaviours. In general, the vehicle 104 is configured to complete the process that gave rise to the requirement identified at block 705.

The vehicle 104 is therefore configured, at block 740, to resume the process that lead to the affirmative determination at block 705. When the process was a path execution process, the received (or retrieved) operational constraint data, such as a speed limit, can be incorporated into the path execution process to set a speed of the vehicle 104 during execution of the path. When the process was a path generation process, the operational constraint data can be incorporated into the process, for example by rerouting the path to avoid travelling against the direction mandated by one-way zones.

In further embodiments, the vehicle 104 can be configured to initiate a predetermined behaviour based on the operational constraint data received from computing device 108 or retrieved from cache 264. For example, each vehicle 104 can maintain, in memory 254, sets of instructions defining specific routines, such as a sequence of movements for parking or docking the vehicle 104. In some embodiments, a type of operational constraint can define parking zones within the facility, and thus at block 740 a vehicle 104 can be configured, having requested parking zone data, to initiate a parking routine upon determining that its current location is within a parking zone.

Variations to the above systems and methods are contemplated. For example, in some embodiments, computing device 108 itself can perform the determination at block 705. For example, in some systems computing device 108, rather than vehicles 104, is responsible for generating paths for vehicles 104. Thus, the receipt of a request to generate a path can result in an affirmative determination at block 705 (at computing device 108 rather than a vehicle 104). Responsive to such a determination, computing device 108 can be configured to perform blocks 720, 725, 730 (which would be performed internally within computing device 108) and 740 by retrieving operational constraints required for path generation, generating a path and sending the path to the relevant vehicle 104. Blocks 710, 715 and 735 would be omitted from such embodiments.

In a further variation, vehicles 104 may request, at block 720, a partial operational constraint or a binary decision, rather than complete operational constraint data. For example, a vehicle 104 can request a speed limit for the vehicle's current location. In response, computing device 108 can transmit only a speed limit to vehicle 104 (or indeed, any other requested property), rather than the zone to which the speed limit applies). In another example, the vehicle 104 can request confirmation that a current location of the vehicle is acceptable (i.e. complies with operational constraints). Rather than providing the operational constraints to the vehicle 104, computing device 108 can perform the determination locally and send an indication of whether or not the vehicle's current location is acceptable or not (that is, without sending any operational constraints).

In a further variation, vehicles 104 can update operational constraints. As noted earlier, vehicles 104 are equipped with sensors and can thus gather data about their environments. Vehicles can thus be configured to compare data gathered via their sensors to operational constraint data in cache 264. When the comparison reveals that the operational constraint data does not matched the sensed data, a vehicle 104 can send a request to computing device 108 to update an operational constraint (e.g. a request received by computing device 108 at block 410 of method 400). As an example of such a vehicle-driven update, a vehicle 104 may have a sensor capable of measuring the height of surrounding objects in the facility. The vehicle may therefore measure the height clearance in a region of the facility and determine that the height clearance specified in a corresponding operational constraint does not match the measurement.

The scope of the claims should not be limited by the embodiments set forth in the above examples, but should be given the broadest interpretation consistent with the description as a whole.

We claim:
1. A system, comprising:
at least one robot for deployment in an environment;
a computing device connected to the at least one robot via a network, the computing device storing, in a memory, a plurality of operational constraints; each operational constraint including (i) a class identifier that identifies at least one of a speed limit and a travel direction associated with a region of the environment, (ii) an indication of the region, and (iii) a property defining a constraint on an operation of the at least one robot within the region, the computing device configured to:
receive a request sent from one of the at least one robot, the request associated with an operational constraint,
responsive to receiving the request, retrieve an operational constraint from the memory based on the request, and
send the retrieved operational constraint to the one of the at least one robot,
wherein the one of the at least one robot operates according to the retrieved operational constraint by controlling at least one of a speed of at least one drive motor of the robot and a direction of the one of the at least one robot based on the one of the at least one robot being located within the region of the environment.

2. The system of claim 1, wherein the region is at least one of an area and a volume within the environment.

3. The system of claim 2, wherein a set of regions for a plurality of the operational constraints having the same class are stored as polygons in an image file; and wherein properties corresponding to the set of regions are stored in association with the polygons.

4. The system of claim 1, wherein the request identifies a location within the environment; the computing device configured to retrieve any operational constraints indicating regions that intersect the location.

5. The system of claim 1, wherein the request identifies a class of operational constraint; the computing device configured to retrieve any operational constraints including classes that match the requested class.

6. The system of claim 1, the one of the at least one robot further configured, prior to sending the request, to execute a navigational process and to determine whether any operational constraints are required for the navigational process.

7. The system of claim 6, wherein the navigational process comprises at least one of: path generation, path execution, and mapping and localization.

8. The system of claim 6, the one of the at least one robot further configured, when the determination is affirmative, to examine a cache in a robot memory to assess that the required operational constraints are present in the cache.

9. The system of claim 8, the one of the at least one robot further configured, when the required operational constraints are not present in the cache, to send the request.

10. The system of claim 6, the one of the at least one robot further configured to receive the operational constraint from the computing device, to store the operational constraint in the robot memory, and to resume execution of the navigational process.

11. The system of claim 10, wherein the navigational process is a path execution process; the one of the at least one robot configured to set a speed of travel for the path execution process based on the operational constraint.

12. The system of claim 1, the computing device further configured, prior to storing the plurality of operational constraints, to store operational constraint templates, each template including (i) a class and (ii) a property definition.

13. The system of claim 12, the computing device further configured to receive a request to create the operational constraint based on at least one of the operational constraint templates prior to receiving the request from the one of the at least one robot.

14. The system of claim 13, the computing device further configured, responsive to receiving the request to create the operational constraint, to present a list of the operational constraint templates and to receive a selection of one of the operational constraint templates.

15. The system of claim 14, the computing device further configured to retrieve and present the property definition for the selected operational constraint template, to receive a value corresponding to the property definition, and to create and store a new operational constraint containing (i) the class of the operational constraint template and (ii) a property containing the value.

16. The system of claim 12, the computing device further configured to determine any of the operational constraints having overlapping regions contain conflicting properties.

17. The system of claim 12, the computing device further configured to determine whether any of the operational constraints having adjacent regions contain potentially conflicting properties.

18. A method in a system having at least one robot for deployment in an environment and a computing device connected to the at least one robot via a network, the method comprising:
storing, in a memory of the computing device, a plurality of operational constraints; each operational constraint including (i) a class identifier that identifies one of a speed limit and a travel direction restriction of a region of the environment, (ii) an indication of the region, and (iii) a property defining a constraint on an operation of the at least one robot within the region;
at the computing device:
receiving a request sent from one of the at least one robot, the request associated with an operational constraint;
responsive to receiving the request, retrieving an operational constraint from the memory based on the request;
sending the retrieved operational constraint to the one of the at least one robot; and
operating the one of the at least one robot according to the retrieved operational constraint by controlling at least one of a speed of at least one drive motor of the robot and a direction of the one of the at least one robot based on the one of the at least one robot being located within the region of the environment.

19. A non-transitory computer-readable medium storing computer-readable instructions for execution by a processor of a computing device for causing the computing device to perform a method, the method comprising:
storing a plurality of operational constraints; each operational constraint including (i) a class identifier that identifies one of a speed limit and a travel direction restriction of a region of the environment, (ii) an indication of the region in which at least one robot is to be deployed, and (iii) a property defining a constraint on an operation of the at least one robot within the region;
receiving a request sent from one of the at least one robot, the request associated with an operational constraint;
responsive to receiving the request, retrieving an operational constraint from the memory based on the request;
sending the retrieved operational constraint to the one of the at least one robot via the network; and
operating the one of the at least one robot according to the retrieved operational constraint by controlling at least one of a speed of at least one drive motor of the robot and a direction of the one of the at least one robot based on the one of the at least one robot being located within the region of the environment.

* * * * *